(12) United States Patent
Niva et al.

(10) Patent No.: US 7,901,326 B2
(45) Date of Patent: Mar. 8, 2011

(54) USER-SPECIFIC PERFORMANCE MONITOR, METHOD, AND COMPUTER SOFTWARE PRODUCT

(75) Inventors: Arto Niva, Jääli (FI); Hannu Kinnunen, Oulu (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 11/788,787

(22) Filed: Apr. 20, 2007

(65) Prior Publication Data

US 2008/0214359 A1    Sep. 4, 2008

(30) Foreign Application Priority Data

May 4, 2006    (FI) ..................................... 20065290

(51) Int. Cl.
*A63B 71/00*    (2006.01)
*A63B 23/00*    (2006.01)
*A63B 69/00*    (2006.01)
*G09B 9/00*    (2006.01)

(52) U.S. Cl. .............................. 482/9; 482/148; 434/247

(58) Field of Classification Search .................. 482/1–9, 482/148, 900; 377/24.2; 702/160; 235/105; 600/595
See application file for complete search history.

(56) References Cited

U.S. PATENT DOCUMENTS

| | | | | |
|---|---|---|---|---|
| 4,050,171 A * | 9/1977 | Teach | ............................. | 37/348 |
| 4,691,453 A * | 9/1987 | Tifre | ............................... | 36/8.3 |
| 5,149,084 A * | 9/1992 | Dalebout et al. | .................. | 482/3 |
| 5,154,677 A * | 10/1992 | Ito | ..................................... | 482/8 |
| 5,179,792 A * | 1/1993 | Brantingham | .................... | 36/29 |
| 5,249,376 A * | 10/1993 | Capria | ............................ | 36/115 |
| 5,286,043 A * | 2/1994 | Tkaczyk | ................. | 280/11.223 |
| 5,290,205 A * | 3/1994 | Densmore et al. | ............. | 482/54 |
| 5,308,300 A * | 5/1994 | Chino et al. | .................... | 482/52 |
| 5,335,188 A * | 8/1994 | Brisson | ........................ | 702/163 |
| 5,387,164 A * | 2/1995 | Brown, Jr. | ......................... | 482/9 |
| 5,388,350 A * | 2/1995 | Parker, Jr. | ....................... | 36/115 |
| 5,437,289 A * | 8/1995 | Liverance et al. | ............ | 600/592 |
| 5,449,002 A * | 9/1995 | Goldman | ..................... | 600/592 |
| 5,545,112 A * | 8/1996 | Densmore et al. | ............. | 482/54 |
| 5,598,849 A * | 2/1997 | Browne | ........................ | 600/520 |
| 5,615,132 A * | 3/1997 | Horton et al. | ..................... | 703/7 |
| 5,794,361 A * | 8/1998 | Sadler | .............................. | 36/29 |
| 5,813,142 A * | 9/1998 | Demon | ............................ | 36/29 |
| 5,890,997 A * | 4/1999 | Roth | ............................... | 482/8 |

(Continued)

FOREIGN PATENT DOCUMENTS

EP    1213561 A1    6/2002

(Continued)

*Primary Examiner* — Rinaldi I Rada
*Assistant Examiner* — Robert F Long
(74) *Attorney, Agent, or Firm* — Hoffmann & Baron, LLP

(57) ABSTRACT

A method for determining an exertion parameter during physical exercise, user-specific performance monitor implementing the method, and computer software product. The method includes determining a propagation variable characterizing the user's propagation; determining a gravitational motion variable characterizing the user's motion in the direction of the gravitational field; calculating an inclination factor proportional to the inclination of a propagation base in accordance with the propagation variable and the gravitational motion variable; calculating a propagation factor proportional to propagation efficiency characterizing the user's ability to move with respect to the inclination of the propagation base, the propagation factor having a different calculated value based on whether the inclination factor is positive or negative for the same base value of the inclination factor; and calculating an exertion parameter that characterizes the user's energy consumption along the propagation route in accordance with the propagation variable, the gravitational motion variable, and the propagation factor.

13 Claims, 4 Drawing Sheets

U.S. PATENT DOCUMENTS

| | | | |
|---|---|---|---|
| 5,899,963 A | 5/1999 | Hutchings | |
| 5,916,063 A * | 6/1999 | Alessandri | 482/4 |
| 5,931,763 A * | 8/1999 | Alessandri | 482/4 |
| 5,944,633 A * | 8/1999 | Wittrock | 482/4 |
| 5,947,486 A * | 9/1999 | Zell | 280/11.201 |
| 6,032,108 A * | 2/2000 | Seiple et al. | 702/97 |
| 6,050,357 A * | 4/2000 | Staelin et al. | 180/65.1 |
| 6,059,062 A * | 5/2000 | Staelin et al. | 180/181 |
| 6,239,501 B1 * | 5/2001 | Komarechka | 290/1 R |
| 6,244,988 B1 * | 6/2001 | Delman | 482/8 |
| 6,251,048 B1 * | 6/2001 | Kaufman | 482/8 |
| 6,255,799 B1 * | 7/2001 | Le et al. | 320/107 |
| 6,315,694 B1 * | 11/2001 | Osu et al. | 482/8 |
| 6,336,891 B1 | 1/2002 | Fedrigon et al. | |
| 6,497,638 B1 * | 12/2002 | Shea | 482/8 |
| 6,503,173 B2 * | 1/2003 | Clem | 482/8 |
| 6,506,142 B2 * | 1/2003 | Itoh et al. | 482/8 |
| 6,527,674 B1 * | 3/2003 | Clem | 482/8 |
| 6,536,785 B2 * | 3/2003 | Lee | 280/11.27 |
| 6,571,200 B1 * | 5/2003 | Mault | 702/182 |
| 6,629,698 B2 * | 10/2003 | Chu | 280/11.19 |
| 6,659,916 B1 * | 12/2003 | Shea | 482/57 |
| 6,687,535 B2 * | 2/2004 | Hautala et al. | 600/520 |
| 6,702,719 B1 * | 3/2004 | Brown et al. | 482/8 |
| 6,736,759 B1 | 5/2004 | Stubbs et al. | |
| 6,740,007 B2 * | 5/2004 | Gordon et al. | 482/9 |
| 6,783,482 B2 * | 8/2004 | Oglesby et al. | 482/54 |
| 6,786,848 B2 * | 9/2004 | Yamashita et al. | 482/8 |
| 6,790,178 B1 * | 9/2004 | Mault et al. | 600/300 |
| 6,793,607 B2 * | 9/2004 | Neil | 482/8 |
| 6,808,473 B2 * | 10/2004 | Hisano et al. | 482/8 |
| 6,813,582 B2 | 11/2004 | Levi et al. | |
| 6,824,502 B1 * | 11/2004 | Huang | 482/54 |
| 6,832,109 B2 * | 12/2004 | Nissila | 600/509 |
| 6,836,744 B1 * | 12/2004 | Asphahani et al. | 702/141 |
| 6,863,641 B1 * | 3/2005 | Brown et al. | 482/8 |
| 6,866,613 B1 * | 3/2005 | Brown et al. | 482/8 |
| 6,955,630 B2 * | 10/2005 | Sher | 482/8 |
| 6,991,586 B2 * | 1/2006 | Lapcevic | 482/8 |
| 6,997,852 B2 * | 2/2006 | Watterson et al. | 482/1 |
| 7,022,047 B2 * | 4/2006 | Cohen et al. | 482/8 |
| 7,044,891 B1 * | 5/2006 | Rivera | 482/8 |
| 7,056,265 B1 * | 6/2006 | Shea | 482/8 |
| 7,060,006 B1 * | 6/2006 | Watterson et al. | 482/54 |
| 7,060,008 B2 * | 6/2006 | Watterson et al. | 482/54 |
| 7,070,539 B2 * | 7/2006 | Brown et al. | 482/8 |
| 7,097,588 B2 * | 8/2006 | Watterson et al. | 482/8 |
| 7,107,706 B1 * | 9/2006 | Bailey et al. | 36/88 |
| 7,115,076 B2 * | 10/2006 | Oglesby et al. | 482/54 |
| 7,128,693 B2 * | 10/2006 | Brown et al. | 482/8 |
| 7,163,490 B2 * | 1/2007 | Chen | 482/8 |
| 7,166,062 B1 * | 1/2007 | Watterson et al. | 482/8 |
| 7,174,976 B2 * | 2/2007 | Kamen et al. | 180/19.1 |
| 7,186,270 B2 * | 3/2007 | Elkins | 623/24 |
| 7,195,251 B2 * | 3/2007 | Walker | 280/11.19 |
| 7,204,041 B1 * | 4/2007 | Bailey et al. | 36/29 |
| 7,219,449 B1 * | 5/2007 | Hoffberg et al. | 36/88 |
| 7,254,516 B2 * | 8/2007 | Case et al. | 702/182 |
| 7,261,305 B2 * | 8/2007 | Cole | 280/87.042 |
| 7,303,032 B2 * | 12/2007 | Kahlert et al. | 180/65.1 |
| 7,350,787 B2 * | 4/2008 | Voss | 280/5.5 |
| 7,354,380 B2 * | 4/2008 | Volpe, Jr. | 482/4 |
| 7,370,713 B1 * | 5/2008 | Kamen | 180/7.1 |
| 7,383,908 B2 * | 6/2008 | Tuli | 180/181 |
| 7,395,614 B1 * | 7/2008 | Bailey et al. | 36/28 |
| 7,610,972 B2 * | 11/2009 | Adams et al. | 180/65.1 |
| 7,621,850 B2 * | 11/2009 | Piaget et al. | 482/8 |
| 7,658,695 B1 * | 2/2010 | Amsbury et al. | 482/8 |
| 7,766,794 B2 * | 8/2010 | Oliver et al. | 482/8 |
| 2001/0004622 A1 * | 6/2001 | Alessandri | 482/8 |
| 2001/0022433 A1 * | 9/2001 | Chang | 280/11.19 |
| 2001/0032743 A1 * | 10/2001 | Kamen et al. | 180/7.1 |
| 2001/0033145 A1 * | 10/2001 | Filo | 318/568.12 |
| 2001/0041647 A1 * | 11/2001 | Itoh et al. | 482/9 |
| 2004/0007835 A1 * | 1/2004 | Yang | 280/11.19 |
| 2004/0066011 A1 * | 4/2004 | Chu et al. | 280/11.19 |
| 2004/0094613 A1 * | 5/2004 | Shiratori et al. | 235/105 |
| 2004/0102684 A1 * | 5/2004 | Kawanishi et al. | 600/300 |
| 2004/0239056 A1 * | 12/2004 | Cho et al. | 280/7.1 |
| 2005/0184878 A1 * | 8/2005 | Grold et al. | 340/573.7 |
| 2005/0233859 A1 * | 10/2005 | Takai et al. | 482/3 |
| 2005/0261609 A1 * | 11/2005 | Collings et al. | 600/592 |
| 2005/0276164 A1 * | 12/2005 | Amron | 368/82 |
| 2006/0022417 A1 * | 2/2006 | Roderick | 280/11.19 |
| 2006/0079800 A1 * | 4/2006 | Martikka et al. | 600/546 |
| 2008/0214903 A1 * | 9/2008 | Orbach | 600/301 |

FOREIGN PATENT DOCUMENTS

| | | |
|---|---|---|
| EP | 1 547 521 | 6/2005 |
| GB | 2 239 523 | 7/1991 |
| WO | WO 2006/065679 | 6/2006 |

\* cited by examiner

USER-SPECIFIC PERFORMANCE MONITOR, METHOD, AND COMPUTER SOFTWARE PRODUCT

CROSS-REFERENCE-TO RELATED APPLICATION

This application claims priority to Finnish Patent Application Serial No. 20065290, filed on May 4, 2006, which is incorporated herein by reference.

BACKGROUND OF THE INVENTION

1. Field of the Invention

The invention relates to a method for determining an exertion parameter of a physical exercise, a user-specific performance monitor, and a computer software product.

2. Description of the Related Art

Physical exercises, such as walking and running, involve physical exertion, which may be determined by measuring a motion variable associated with the physical exercise with a user-portable device.

In prior art solutions, measurement of physical exertion is insensitive to the effect of elevation differences of the terrain on the physical exertion.

Thus, it is useful to examine techniques for determining the user's exertion during a physical exercise.

SUMMARY OF THE INVENTION

It is an object of the invention to provide a method, a user-specific performance monitor and a computer software program in such a manner that when the user's exertion level is determined, the effect of elevation differences in the terrain is taken into account. A first aspect of the invention provides a method for determining an exertion parameter of a physical exercise, the method comprising determining, in a user-specific performance monitor, a propagation variable characterizing the user's propagation; determining, in the user-specific performance monitor, a gravitational motion variable characterizing the user's motion in the direction of the gravitational field; and calculating the user's exertion parameter by means of the propagation variable and the gravitational motion variable.

A second aspect of the invention provides a user-specific performance monitor comprising: means for determining a propagation variable characterizing the user's propagation, means for determining a gravitational motion variable characterizing the user's propagation in the direction of the gravitational field; and means for calculating the user's exertion parameter by means of the propagation variable and the gravitational motion variable.

Another aspect of the invention provides a computer software product comprising coded instructions for executing a computer process in a digital processor, the computer process being suitable for determining a user exertion parameter of a physical exercise and comprising the steps of: determining, in a user-specific performance monitor, a propagation variable characterizing the user's propagation; determining, in the user-specific performance monitor, a gravitational motion variable characterizing the user's motion in the direction of the gravitational field; and calculating the user's exertion parameter by means of the propagation variable and the gravitational motion variable.

Preferred embodiments of the invention are disclosed in the dependent claims.

The invention is based on the idea that when the user's exertion level is calculated during a physical exercise, a propagation variable and a gravitational motion variable are used, which take the effect of the earth's gravitational field on the physical exertion into account.

The method, user-specific performance monitor and computer software product of the invention provide a plurality of advantages. One advantage is a reliable estimate of the user's exertion during a physical exercise.

BRIEF DESCRIPTION OF THE DRAWINGS

The invention will now be described in greater detail in connection with preferred embodiments and with reference to the attached drawings, in which.

DETAILED DESCRIPTION OF THE PREFERRED EMBODIMENTS

Figure 1:
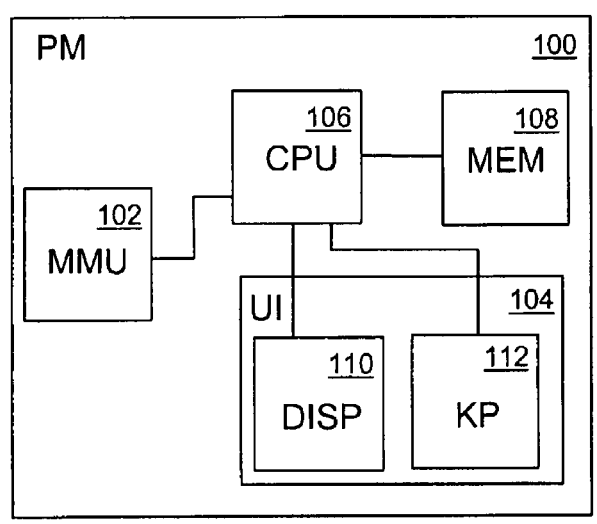
FIG. 1 shows a first example of the structure of a user-specific performance monitor.

With reference to the example of FIG. 1, a user-specific performance monitor 100 comprises a central processing unit (CPU) 106 and a memory unit (MEM) 108. The central processing unit 106 comprises a digital processor and executes a computer process for determining an exertion parameter of the user of the user-specific performance monitor 100 according to coded instructions stored in the memory unit 108.

The user-specific performance monitor 100 is a user-portable and user-operated electronic device, which measures and registers parameters associated with the user's exercise. In this context, the user-specific performance monitor 100 is called performance monitor 100. Performance may refer to, for instance, walking, running or skiing without, however, restricting to these.

The user-specific performance monitor 100 may also comprise a motion measurement unit (MMU) 102, which measures variables characterizing the user's motion.

According to an embodiment, the motion measurement unit 102 comprises a satellite positioning unit, which receives radio signals from satellites of the satellite positioning system and determines the location and/or time of the performance monitor. The satellite positioning system may be, for instance, a GPS system (Global Positioning System), the Russian GLONASS system (Global Navigation Satellite System) or the European Galileo system. In this case, the motion measurement unit 102 may supply the location information and possibly the time information associated with the user's propagation to the central processing unit 106 or the memory unit 108. According to an embodiment, the motion measurement unit 102 determines the user's propagation velocity and the velocity component in the direction of the gravitational field and supplies the propagation velocity and the velocity component in the direction of the gravitational field to the central processing unit 106.

According to an embodiment, the motion measurement unit 102 comprises a motion-sensitive sensor, such as an acceleration sensor, registering motion of the user. The acceleration sensor transforms the acceleration caused by motion or gravity into an electric signal. A variety of technologies may be used for measuring the motion. Piezoresistor technology employs material, resistance of which changes when it is compressed together. Mass acceleration produces a force which is directed at the piezoresistor. As constant current is led through the piezoresistor, voltage that acts over the piezoresistor changes according to the compression caused by the acceleration. In piezoelectric technology, a piezoelectric sensor generates a charge when the acceleration sensor is accelerated. In silicon bridge technology, a silicon chip is etched in such a manner that silicon mass remains at the end of a silicon bar for the silicon chip. When the silicon chip is subjected to acceleration, the silicon mass directs a force at the silicon bar and the resistance of the silicon bar changes. Micro-machined silicon technology is based on the use of a differential capacitor. Voice coil technology is based on the same principle as a microphone. Examples of suitable motion sensors include Analog Devices ADXL105, Pewatron HW and VTI Technologies SCA-serie.

Acceleration information generated by the acceleration sensor may be supplied to the central processing unit 106 or the memory unit 108.

The motion measurement unit 102 may also be based on other suitable technologies, such as a gyroscope integrated onto a silicon chip, a micro vibration switch in a surface mounting component, a mechanical pendulum or a sensor sensitive to the magnetic field.

According to an embodiment, the motion measurement unit 102 comprises a pressure sensor for measuring the pressure of the environment. The pressure sensor may measure absolute pressure, and it may be based on a comparison between the prevailing pressure and the vacuum. The pressure sensor may comprise a silicon film, which includes piezoresistive resistors, for instance.

Pressure information may be converted into elevation information by means of a table or a mathematical function, for example. The presented solution pays attention to pressure changes in connection with elevation differences, and thus a pressure value may be allowed to have an error.

Pressure differences correspond to slightly different elevation differences at different heights. For instance, a pressure difference of 1 hPa at sea level corresponds to an elevation difference of about 8 meters, at 3000 m to an elevation difference of about 11 meters, and at 6000 m to an elevation difference of about 15 meters. According to an embodiment, the pressure gauge is thus a calibrated pressure gauge. The motion measurement unit 102 may also perform an automatic temperature compensation, which is specified by calibrating, if necessary. The temperature compensation may be based on temperature dependence of the weight of an air column, when the temperature profile of the atmosphere is known as a function of elevation.

The motion measurement unit 102 may comprise a preprocessing unit for processing primary motion information, such as location information, acceleration information and/or vibration information. The processing may comprise conversion of primary motion information into secondary motion information, such as conversion of location information into velocity information, conversion of pressure information into location and/or velocity information in the direction of the gravitational field, and/or conversion of acceleration information into information on the quantity or pulses of motions. The processing may further comprise filtering of primary and/or secondary motion information.

The user-specific performance monitor 100 may also comprise a user interface (UI) 104, which typically includes a display unit (DISP) 110 and a display controller. The display unit 110 may include LCD (Liquid Crystal Display) components, for instance. The display unit 110 may display, for instance, an exertion parameter, location altitude, inclination of propagation base, number of steps taken and/or the covered distance graphically and/or numerically to the user.

The user interface 102 may also comprise a keypad (KP) 112, by which the user may enter commands in the performance monitor 100.

Figure 2:
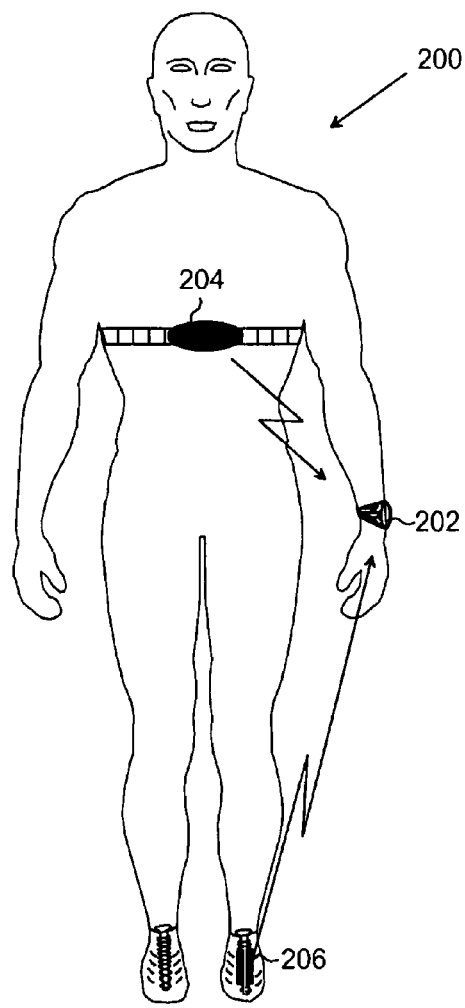
FIG. 2 shows a second example of the structure of a user-specific performance monitor.

With reference to FIG. 2, the performance monitor may comprise a central processing unit 202 to be attached to the user's 200 upper limb and one or more peripheral devices 204, 206.

The central processing unit 202 typically comprises the user interface 112, the memory unit 108 and the central processing unit 106 of FIG. 1. According to an embodiment, the central processing unit 202 comprises the motion measurement unit 102.

According to an embodiment, the peripheral device 204 is a heart rate transmitter, which measures electromagnetic pulses induced from the user's heart and signals the pulse information to the central processing unit 202. In this case the performance monitor 100 is generally known as a heart rate monitor.

According to an embodiment, the peripheral device 206 is a motion sensor to be attached to the user's inferior limb and measuring motion information on the inferior limb, such as its acceleration, and signaling primary or secondary motion information on the acceleration to the central processing unit 202.

Figure 3:
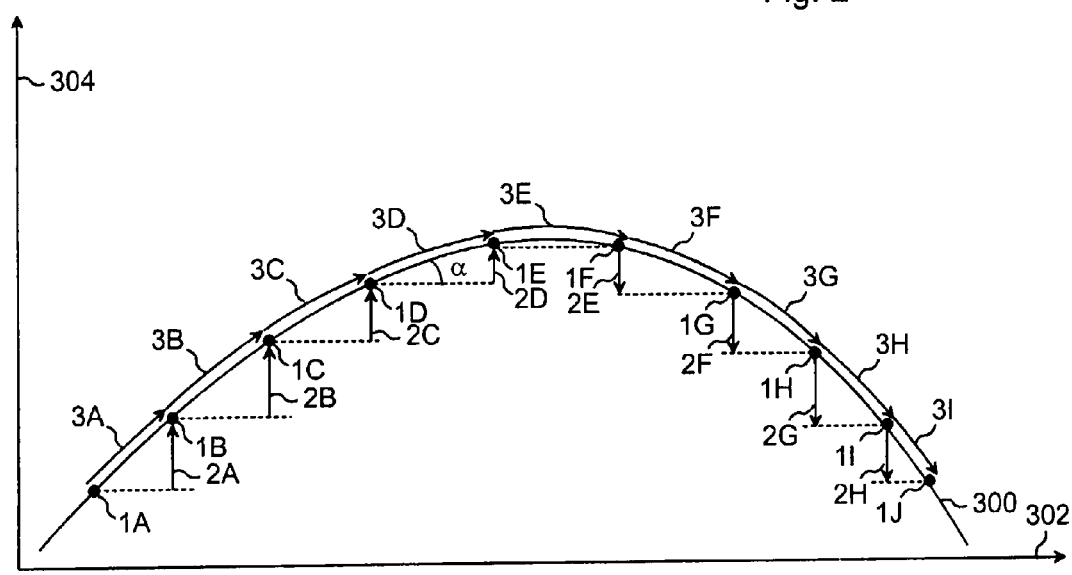
FIG. 3 shows an example of the user's propagation route.

With reference to FIG. 3, let us examine an example of a propagation route 300 of the user 200. A horizontal axis 302 illustrates horizontal location coordinates, and a vertical axis 304 illustrates vertical location coordinates. In this example the vertical axis 304 is parallel to the earth's gravitational field.

The propagation route 300 may be divided into propagation points 1A to 1J, at each of which a propagation variable characterizing the user's propagation and a gravitational motion variable characterizing motion in the direction of the gravitational field may be determined.

Propagation motion is typically motion in the direction of the propagation route 300, which may include components parallel to the horizontal axis 302 and to the vertical axis 304. The propagation variable may be propagation velocity, location and/or pulse frequency of propagation, number of pulses, pulse width, step contact time or some other motion variable to be associated with the propagation variable.

Motion in the direction of the gravitational field is motion in the direction of the vertical axis 304 or motion in the direction opposite to the vertical axis 304.

The propagation points 1A to 1J may represent measurement points, at which the propagation variable and the gravitational motion variable are determined. The propagation variable and the gravitational motion variable may be determined at predefined time intervals, in which case the location of the propagation points on the propagation route typically depends on the propagation velocity of the user. The predefined time interval may depend on the resolution of the determination of the propagation variable and/or the gravitational motion variable. The predefined time interval may be few dozens of seconds or a few minutes. In an embodiment, the predefined time interval is one minute.

The propagation point 1A to 1J may be associated with an elementary propagation variable and an elementary gravitational motion variable.

According to an embodiment, the elementary propagation variable is an elementary distance 3A to 3I measured in a predefined time interval, which may be the distance between the successive propagation points 1A to 1J. The elementary distance 3A to 3I may be processed, for instance, as a unit of distance, such as meters, or a unit proportional to distance, such as a number of pulses in connection with the user's propagation.

According to an embodiment, the elementary gravitational motion variable is an elementary elevation difference 2A to 2H between the successive propagation points 1A to 1J. The elementary elevation difference 2A to 2H may be processed as a unit of elevation difference, such as meters, or a unit proportional to elevation difference, such as pressure.

Figure 4:
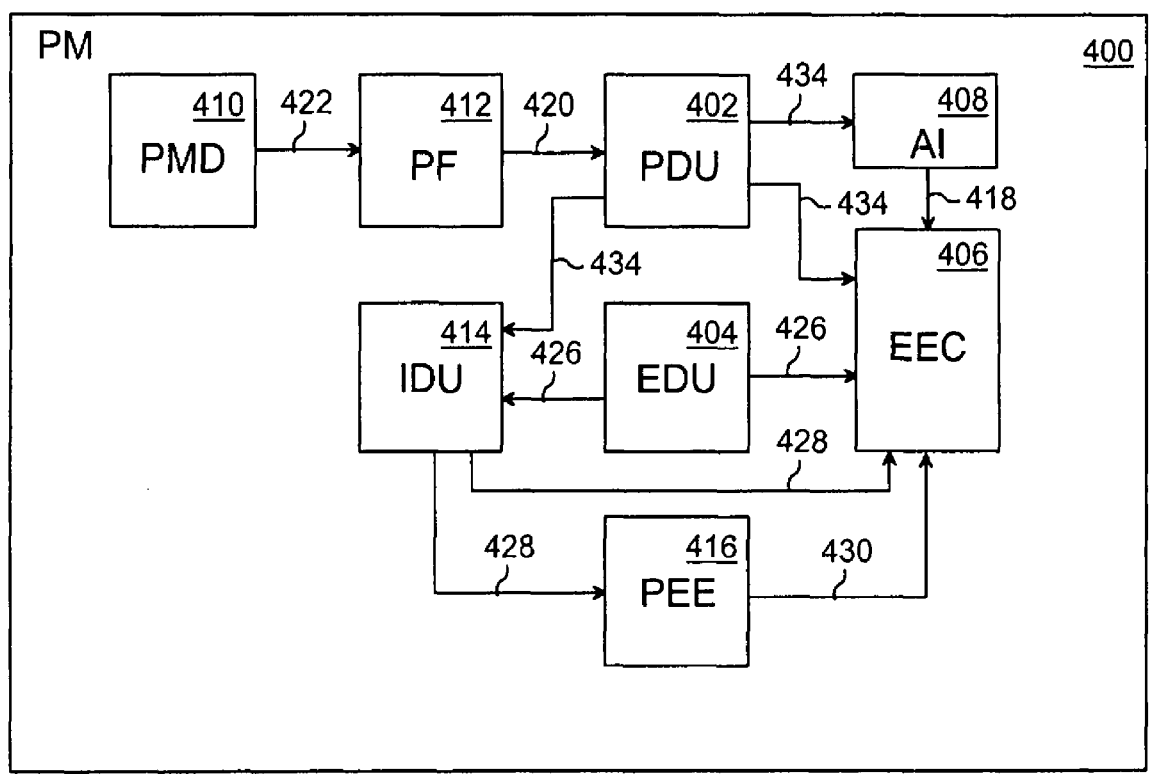
FIG. 4 shows a third example of the structure of a user-specific performance monitor.

With reference to FIG. 4, the performance monitor 400 comprises a propagation determination unit (PDU) 402, an elevation determination unit (EDU) 404 and an exertion counter (EC) 406 functionally connected to the propagation determination unit 402 and the elevation determination unit 404.

The propagation determination unit 402 determines a propagation variable 434 characterizing the user's propagation and supplies the propagation variable 434 to the exertion parameter counter 406.

The elevation determination unit 404 determines a gravitational motion variable 426 characterizing the user's motion in the direction of the gravitational field and supplies the gravitational motion variable 426 to the exertion counter 406.

The exertion counter 406 calculates the user's exertion parameter on the basis of the propagation variable 434 and the gravitational motion variable 426.

The exertion parameter characterizes, for example, the user's energy consumption on the propagation route 300 or the instantaneous energy consumption in a time unit at a point of the propagation route 300.

The propagation variable 434 may be, for example, the elementary distance 3A to 3I, motion pulses formed during the covered elementary distance 3A to 3I, propagation velocity determined at a propagation point 1A to 1J or average velocity in the covered elementary distance 3A to 3I.

The gravitational motion variable 426 may be, for instance, the elementary elevation difference 2A to 2H between the successive propagation points 1A to 1J, velocity of ascent or descent, pressure measured at the propagation points 1A to 1J, or pressure difference between the successive propagation points 1A to 1J.

According to an embodiment, the performance monitor 400 comprises a pulse measuring device (PMD) 410 for measuring motion pulses generated by the user's limb. The pulse measuring device 410 generates motion pulse information 422 from the user's limb movement and supplies the motion pulse information 422 to a pulse filter 412. The motion pulse information 422 may comprise electric signals, each of which represents a motion pulse, such as a limb swing.

According to an embodiment, the pulse filter 412 filters the motion pulse information 422 on the basis of predefined time properties and supplies the accepted motion pulses 420 to the propagation determination unit 402.

The pulse filter 412 accepts the motion pulses that fulfill the predefined criteria. According to an embodiment, the pulse filter 412 accepts the successive motion pulses, the time interval of which is within predefined limits. For example, a step frequency, a step pair frequency or a frequency of an arm swing are typically 1 to 2 pulses per second. The filtering may be implemented by rejecting the successive motion pulses, the time interval of which is below the predefined lower limit or the time interval of which is above the predefined upper limit.

The predefined upper limit and lower limit may depend on the location of the pulse measuring device 410 on the user's body. If the pulse measuring device 410 is attached to an upper limb, the predefined lower limit may be, for instance, 0.4 seconds. The predefined upper limit may be, for instance, 2.0 seconds, which corresponds to 30 pairs of steps in a minute.

Determining the user's exertion parameter is typically connected to determination of the user's energy consumption at the points of the propagation route.

The energy consumption $E_{TOT}$ of the user during the propagation route 300 may be presented as a sum of elementary energy consumptions $E_i$:

$$E_{TOT} = \sum_i E_i + E_0, \quad (1)$$

where the elementary energy consumption $E_i$ is the energy consumption during the covered elementary distance 3A-3I. The term $E_0$ represents energy consumption, which includes the energy that is consumed at rest and possibly during easy domestic chores.

The elementary energy consumption $E_i$ may be presented as a function of the elementary propagation variable $Q_{Ti}$ and the elementary gravitational motion variable $Q_{Gi}$ $$E_i = E_i(A_1, A_2, Q_{Ti}, Q_{Gi}) \quad (2)$$

where $A_1$ and $A_2$ are scaling factors that convert the motion parameters $Q_{Ti}$ and $Q_{Gi}$ into a desired unit, take into account characteristics of one or more users, which may include age, sex, height and weight, and which scale the motion parameters $Q_{Ti}$ and $Q_{Gi}$ with one another.

According to an embodiment, energy consumption or an exertion parameter proportional to energy consumption is expressed with a value for the user's oxygen consumption, i.e. the VO2 value, the unit of which is milliliter, for instance. The oxygen consumption of one liter corresponds to about 5.0 kcal.

According to an embodiment, the elementary energy consumption may be presented in the form:

$$E_i = A_1 \times Q_{Ti} + A_2 \times Q_{Gi}. \quad (3)$$

The term $A_1 \times Q_{Ti}$ characterizes the energy the user uses for propagating during the covered elementary distance 3A to 3I and consists of the energy consumption associated with the user's body and limb movements.

The term $A_2 \times Q_{Gi}$ characterizes the effect of the earth's gravitation on the user's energy consumption. When the user moves in the gravitational field, his/her potential energy changes, and, for example, during an uphill ascent, in this case when the inclination of the propagation base is positive, energy consumed by the user is converted into potential energy absorbed in the mass of the user and his/her equipment, which is experienced by the user as increased energy consumption or intensity. Accordingly, during a downhill descent, in this case when the inclination of the propagation base is negative, the user experiences that it is easier for him/her to move, and thus the energy consumption per distance unit or time unit with a constant velocity is lower than during an uphill ascent.

When moving downhill, however, the user cannot convert his/her potential energy back into energy to be used in metabolism entirely, and thus alone the negative value of the gravitational motion variable present in downhill descents is not sufficient when the user's energy balance is considered.

According to an embodiment, the exertion counter 406 calculates the user's exertion parameter by using, in the case of a negative inclination factor, the first functional dependence of the exertion parameter on the propagation variable and the gravitational motion variable and, in the case of a positive inclination factor, the second functional dependence of the exertion parameter on the propagation variable and the gravitational motion variable. The second functional dependence differs from the first functional dependence in that with at least one value pair of the propagation variable and the gravitational motion variable, the second functional dependence produces an exertion parameter which is different from the exertion parameter produced by the first functional dependence with said value pair. Thus, the equation (2) may be divided into equations $$E_i^{neg} = E_i^{neg}(A_1^{neg}, a_2^{neg}, \ldots A_N^{neg}, Q_{Ti}, Q_{Gi}), \quad (4)$$

$$E_i^{pos} = E_i^{pos}(A_1^{pos}, A_2^{pos}, \ldots A_M^{pos}, Q_{Ti}, Q_{Gi}) \quad (5)$$

where the equation (4) illustrates the first functional dependence and the equation (5) illustrates the second functional dependence. A parameters of the equations (4) and (5) may be selected in such a manner that they form a continuous representation. The first functional dependence and the second functional dependence may be expressed by a common function of the propagation variable and the gravitational motion variable, such as a polynomial representation. In this case, however, when the inclination factor is negative, the function produces different values than when the inclination factor is positive.

The first functional dependence and the second functional dependence may be determined by matching the A parameters characterizing functional dependencies with test results, for example. Another way of defining parameters is to use results obtained from literature.

If the equations (4) and (5) differ from one another, this may cause that, for instance, after the user has proceeded to a certain point on the propagation route 300 and returned back to the starting point, the energy consumption generated from the gravitational motion variable remains other than zero.

According to an embodiment, the first functional dependence and the second functional dependence are expressed as polynomial series $$E_i^{neg} = A_1^{neg} \times Q_{Ti} + A_2^{neg} \times Q_{Gi} + A_3^{neg} \times Q_{Ti}^2 + a_4^{neg} \times Q_{Gi}^2 + A_5^{neg} \times Q_{Ti} \times Q_{Gi} \quad (6)$$

$$E_i^{pos} = A_1^{pos} \times Q_{Ti} + A_3^{pos} \times Q_{Ti}^2 + A_4^{pos} \times Q_{Gi}^2 + A_5^{pos} \times Q_{Ti} \times Q_{Gi} \quad (7)$$

According to an embodiment, the performance monitor 400 comprises an inclination determination unit (IDU) 414 for calculating an inclination factor proportional to the inclination of the propagation base by means of the propagation variable 434 and the gravitational motion variable 426. As an example, let us examine the propagation point 1D, and the inclination factor α of the propagation base representing this propagation point may be determined by means of the elementary distance and the elementary elevation difference in the proximity of the propagation point 1D by using the sine rule $$\sin\alpha = \frac{C \times \Delta p_i}{D \times K_i}, \quad (8)$$

where $\Delta p_i$ is the pressure difference corresponding to the elementary elevation difference, $K_i$ is the filtered number of pulses measured from the user's motion and corresponding to the elementary distance, and α is the angle between the propagation base and the earth's horizontal level 302. The coefficient C converts the pressure difference into the elevation difference, and the coefficient D converts the number of pulses into the distance traveled. The inclination factor may also be determined by means of a plurality of elementary distances and elementary elevation differences.

The inclination factor may also be determined, for instance, by means of location and elevation readings given by a satellite positioner.

The inclination determination unit 414 receives the propagation variable 434 and the gravitational motion variable 426 and determines the inclination factor by means of the equation (8) or the average of the equation (8), for example. The shown solution is not limited to the use of the equation (8), but the inclination factor may be calculated by means of any suitable relation.

The inclination factor may also act as a variable in the equations (6) and (7) describing the elementary energy consumption, whereby the equations (6) and (7) may be presented in the form of $$E_i^{neg} = B_1^{neg} \times K_i + B_2^{neg} \times K_i \times \alpha_i \quad (9)$$

$$E_i^{pos} = B_1^{pos} \times K_i + B_2^{pos} \times K_i \times \alpha_i. \quad (10)$$

According to an embodiment, the performance monitor comprises a propagation efficiency estimator (PEE) 416, which receives inclination information 428 from the inclination determination unit 414 and determines the propagation factor proportional to the user's propagation efficiency as a function of the inclination factor.

Propagation efficiency characterizes the user's ability to move on an inclined propagation base. For example, a steep but descending propagation base requires accurate, well-coordinated movements, which are achieved by shortening the steps. Thus, the propagation efficiency on a steeply descending propagation base may be poorer than on an even or gently descending propagation base.

The propagation efficiency estimator 416 supplies a propagation factor 430 to the exertion counter 406, which calculates the user's exertion parameter by means of the propagation variable, the gravitational motion variable and the propagation factor 430.

According to an embodiment, the negative inclination factor has a different propagation factor than the positive inclination factor.

According to an embodiment, the elementary energy measured at time intervals of one minute, for example, is obtained from the expressions $$E_i^{neg} = CK_i^2 + H \times \frac{\Delta h_i}{K_i^2} + J \times \frac{(\Delta h_i)^2}{K_i^2} + E_0 \quad (11)$$

$$E_i^{pos} = CK_i^2 + D \times \Delta h_i + E_0. \quad (12)$$

The first term $CK_i^2$ of the expressions (10) and (11) takes into account the energy consumption associated with propagation and the term $D \times \Delta h$ takes into account the energy consumed by the growing potential energy. The term $$H \times \frac{\Delta h_i}{K_i^2}$$

takes into account the propagation efficiency on a negative inclination. The term $$H \times \frac{\Delta h_i}{K_i^2}$$

implicitly includes the inclination angle of the propagation base 300. The term $$J \times \frac{(\Delta h_i)^2}{K_i^2}$$

includes released potential energy and also implicitly includes the inclination angle of the propagation base. The coefficients C, D, H and J correspond to the A and B parameters described above.

According to an embodiment, the performance monitor 400 may be programmed to take into account the additional exertion caused by the unevenness or softness of the propagation base. The effect of the propagation base on the energy consumption may be taken into account by means of a terrain factor T, the values of which for different terrain types may be as follows: asphalt 1.0, gravel road 1.1, terrain 1.2, brushwood 1.5, swamp 1.8 and loose sand 2.1. The terrain factor may be taken into account in the expressions (11) and (12) in the following way:

$$E_i^{neg} = T \times \left( CK_i^2 + H \times \frac{\Delta h_i}{K_i^2} + J \times \frac{(\Delta h_i)^2}{K_i^2} \right) + E_0 \quad (13)$$

$$E_i^{pos} = T \times (CK_i^2 + D \times \Delta h_i) + E_0. \quad (14)$$

According to an embodiment, the performance monitor 400 comprises an activity indicator (AI) 408 for determining the user's activity by means of the propagation variable 434. The activity indicator 408 supplies activity information 418 to the exertion counter 406, which calculates the user's exertion parameter, if the user's activity exceeds a predefined activity limit. This procedure may eliminate situations, in which the exertion parameter is determined erroneously due to the use of auxiliary means, such as a lift, a vehicle or skis.

According to an embodiment, the activity indicator 408 identifies the filtered limb movements as rhythmic motion, if the number of time intervals of the filtered, successive motion pulses according to a predefined quantity threshold is within a predefined range of thresholds. The identified rhythmic function may be used for determining the physical activity level. Thus, rhythmic functions are identified so that during them, the majority of motion intervals within a selected range have the same duration as the preceding motion interval. It is advantageous to test the rhythmicity only after very short motion intervals, such as motion pulses with the duration of below 0.6 seconds as described above, have been filtered away. The quantity threshold predefined in the activity indicator may be 65 to 95% of the total number of time interval periods, and the predefined range of thresholds may be ±10 to 30% of the average length of the time interval period. According to an embodiment, the predefined quantity threshold is 75% of the total number of time interval periods and the predefined range of thresholds is +25% of the length of the previous time interval period or the average of the time interval periods.

Further with reference to FIG. 4, the propagation determination unit 402 may be implemented by means of the motion measurement unit 102 shown in FIG. 1 and a coded computer process stored in the memory unit 108 and to be performed in the central processing unit 106.

The elevation determination unit 404 may be implemented by means of the motion measurement unit 102 shown in FIG. 1 and a coded computer process stored in the memory unit 108 and to be performed in the central processing unit 106. According to an embodiment, the elevation determination unit 404 comprises a pressure gauge for measuring the pressure of the environment.

The exertion counter 406 may be implemented by means of a coded computer process stored in the memory unit 108 and to be performed in the central processing unit 106.

The inclination determination unit 414 may be implemented by means of a coded computer process stored in the memory unit 108 and to be performed in the central processing unit 106.

The propagation efficiency estimator 416 may be implemented by means of a coded computer process stored in the memory unit 108 and to be performed in the central processing unit 106.

The pulse measuring unit 410 may be implemented by means of the motion measurement unit 102 and a coded computer process stored in the memory unit 108 and to be performed in the central processing unit 106.

The pulse filter 412 may be implemented by means of a coded computer process stored in the memory unit 108 and to be performed in the central processing unit 106.

Figure 5:
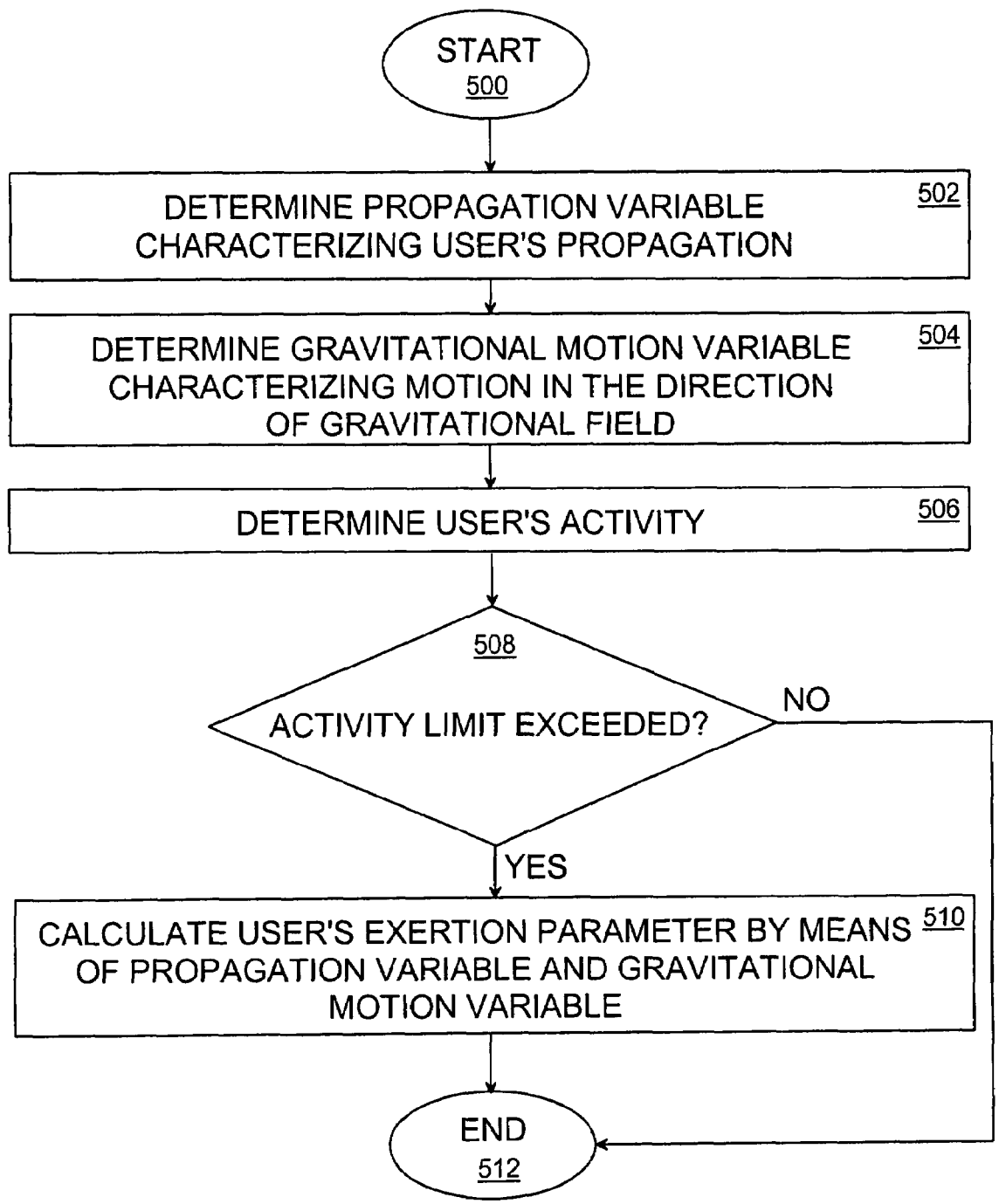
FIG. 5 shows a first example of a method according to an embodiment of the invention.
Figure 6:
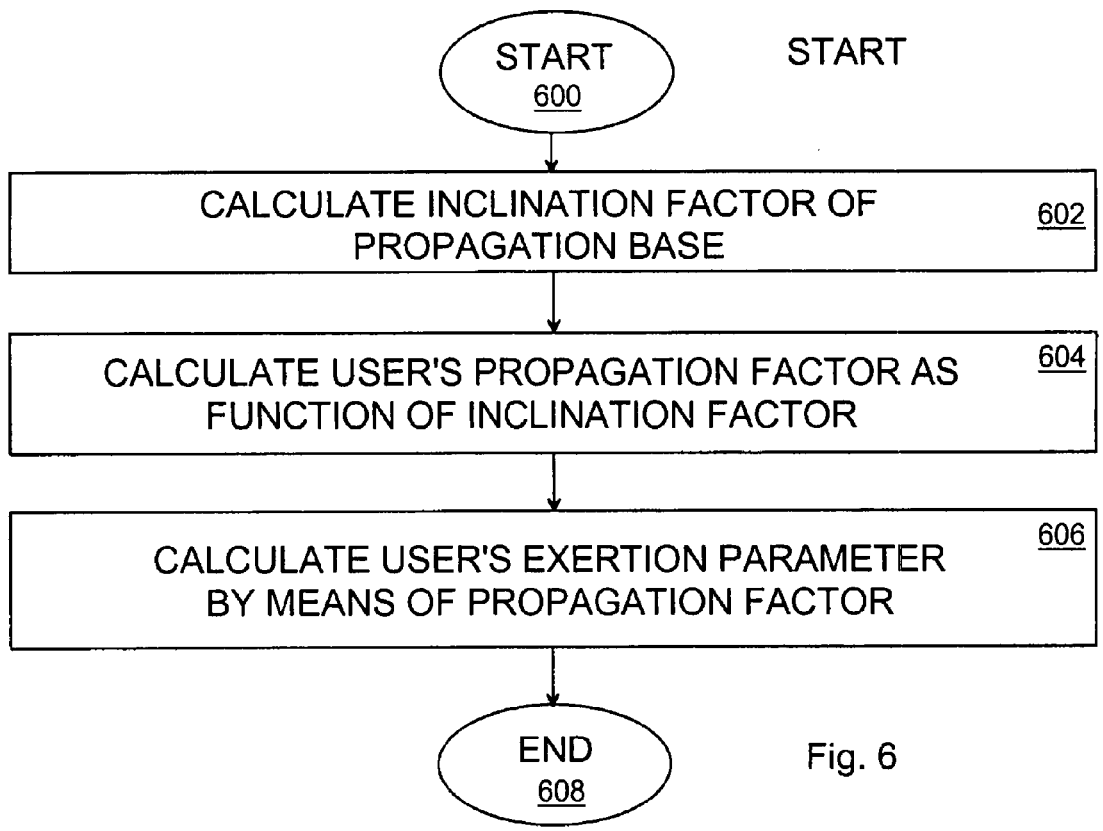
FIG. 6 shows a second example of a method according to an embodiment of the invention.
Figure 7:
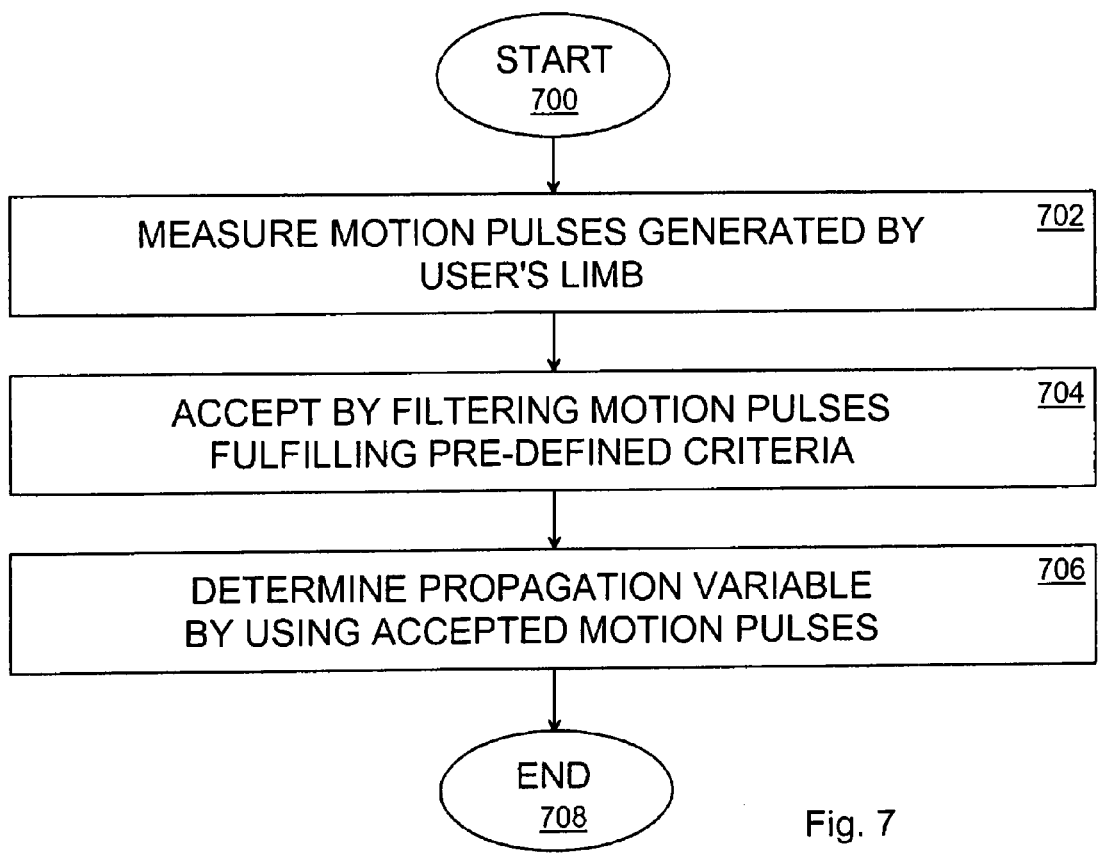
FIG. 7 shows a third example of a method according to an embodiment of the invention.

With reference to FIGS. 5, 6 and 7, methods according to embodiments of the invention are examined.

In FIG. 5, the method starts in 500.

In 502, a propagation variable 434 characterizing the user's propagation is determined in a user-specific performance monitor 100, 202, 204, 206, 400.

In 504, a gravitational motion variable 426 characterizing the user's motion in the direction of the gravitational field is determined in the user-specific performance monitor 100, 202, 204, 206, 400.

In 506, the user's activity is determined.

In 508 it is tested, whether the activity exceeds a predefined activity limit.

If the activity exceeds the predefined activity limit, the user's exertion parameter is calculated in 510 by means of the propagation variable 434 and the gravitational motion variable 426. According to an embodiment, the user's exertion parameter is calculated by using, when the inclination of the propagation base is negative, the first functional dependence of the exertion parameter on the propagation variable and the gravitational motion variable and, when the inclination of the propagation base is positive, the second functional dependence of the exertion parameter on the propagation variable and the gravitational motion variable, the second functional dependence differing from the first functional dependence.

The method ends in 512.

With reference to FIG. 6, the method starts in 600.

In 602, the inclination factor proportional to the inclination of the propagation base is estimated by means of the propagation variable 434 and the gravitational motion variable 426.

In 604, the propagation efficiency of the user is calculated as a function of the inclination of the propagation base.

In 606, the user's exertion parameter is calculated by means of the propagation variable, the gravitational motion variable and the propagation efficiency. According to an embodiment, the user's exertion parameter is calculated by using, when the inclination of the propagation base is negative, the first functional dependence of the propagation efficiency on the propagation variable and the gravitational motion variable and, when the inclination of the propagation base is positive, the second functional dependence of the propagation efficiency on the propagation variable and the gravitational motion variable, the second functional dependence differing from the first functional dependence.

The method ends in 608.

With reference to FIG. 7, the method starts in 700.

In 702, motion pulses generated by the user's limb are measured.

In 704, the motion pulses that fulfill predefined criteria are filtered away.

In 706, a propagation variable is determined by means of unfiltered motion pulses.

The method ends in 708.

An aspect of the invention provides a computer software product, which comprises coded instructions for executing a computer process in a digital processor, the computer process being suitable for determining the user exertion parameter of a physical exercise. The computer process is illustrated in connection with FIGS. 5, 6 and 7.

The computer process may be included in coded instructions which are executed in the central processing unit 106 of the performance monitor 100. Some process steps, such as calculating the exertion parameter, may be performed in an external calculation system, such as a PC or a mobile device, provided that the data of the propagation variable and that of the gravitational motion variable may be transferred between the performance monitor 100, 400 and the external calculation system. The coded instructions may be stored in the memory unit 108 of the performance monitor 100.

The coded instructions may be included in the computer software product and they may be transferred by means of a distribution medium. The distribution medium is, for instance, an electric, magnetic or optical distribution medium. The distribution medium may be a physical distribution medium, such as a memory unit, an optical disk or a telecommunication signal.

Although the invention is described above with reference to the example according to the attached drawings, it is obvious that the invention is not restricted thereto but may be modified in a variety of ways within the scope of the appended claims.

What is claimed is:

1. A method of monitoring a user's performance during physical exercise, the method comprising:
   determining, in a user-specific performance monitor device, a propagation variable characterizing the user's propagation on a propagation route;
   determining, in the user-specific performance monitor device, a gravitational motion variable characterizing the user's motion in the direction of the gravitational field;
   calculating, in the user-specific performance monitor device, an inclination factor proportional to the inclination of a propagation base in accordance with the propagation variable and the gravitational motion variable, the inclination of the propagation base being positive or negative in accordance with the user's motion with respect to the gravitational field;
   calculating, in the user-specific performance monitor device, a propagation factor proportional to a propagation efficiency of the user as a function of the inclination factor, the propagation efficiency characterizing the user's ability to move with respect to the inclination of the propagation base; and
   calculating, in the user-specific performance monitor device, an exertion parameter that characterizes the user's energy consumption along the propagation route based on the propagation variable, the gravitation motion variable and the propagation factor, wherein the user's exertion parameter is calculated by using, when the inclination of the propagation base is negative, a first functional dependence of the exertion parameter on the propagation variable and the gravitational motion variable and, when the inclination of the propagation base is positive, a second functional dependence of the exertion parameter on the propagation variable and the gravitational motion variable, wherein the second functional dependence produces, with at least one value pair of the propagation variable and the gravitational motion variable, an exertion parameter which is different from the exertion parameter produced by the first functional dependence with said value pair.

2. A method as claimed in claim 1, further comprising:
   measuring motion pulses generated by the user's limb;
   accepting the motion pulses that fulfill predefined criteria by filtering; and
   determining the propagation variable in accordance with the accepted motion pulses.

3. A method as claimed in claim 1, further comprising:
   determining the user's activity on the basis of the propagation variable; and
   calculating the user's exertion parameter, if the user's activity exceeds a predefined activity limit.

4. A method as claimed in claim 1, further comprising determining the gravitational motion variable by measuring the pressure of the environment.

5. A method of monitoring a user's performance during physical exercise, the method comprising:
   determining, in a user-specific performance monitor device, a propagation variable characterizing the user's propagation on a propagation route;
   determining, in the user-specific performance monitor device, a gravitational motion variable characterizing the user's motion in the direction of the gravitational field;
   calculating, in the user-specific performance monitor device, an inclination factor proportional to the inclination of a propagation base in accordance with the propagation variable and the gravitational motion variable, the inclination of the propagation base being positive or negative in accordance with the user's motion with respect to the gravitational field;
   calculating, in the user-specific performance monitor device, a propagation factor proportional to a propagation efficiency of the user as a function of the inclination factor, the propagation efficiency characterizing the user's ability to move with respect to the inclination of the propagation base; and
   calculating, in the user-specific performance monitor device, an exertion parameter that characterizes the user's energy consumption along the propagation route based on the propagation variable, the gravitation motion variable and the propagation factor, wherein the user's exertion parameter is calculated by using, when the inclination factor is negative, a first functional dependence of the propagation factor on the propagation variable and the gravitational motion variable and, when the inclination factor is positive, a second functional dependence of the propagation factor on the propagation variable and the gravitational motion variable, wherein the second functional dependence produces, with at least one value pair of the propagation variable and the gravitational motion variable, a propagation factor which is different from the propagation factor produced by the first functional dependence with said value pair.

6. A user-specific performance monitor, comprising:
a propagation determination unit configured to determine a propagation variable characterizing the user's propagation on a propagation route;
an elevation determination unit configured to determine a gravitational motion variable characterizing the user's propagation in the direction of the gravitational field;
an inclination determination unit configured to calculate an inclination factor proportional to the inclination of a propagation base in accordance with the propagation variable and the gravitational motion variable, the inclination of the propagation base being positive or negative in accordance with the user's motion with respect to the gravitational field;
a propagation efficiency estimator configured to calculate a propagation factor proportional to a propagation efficiency of the user as a function of the inclination factor, the propagation efficiency characterizing the user's ability to move with respect to the inclination of the propagation base; and
an exertion counter configured to calculate an exertion parameter that characterizes the user's energy consumption along the propagation route based on the propagation variable, the gravitation motion variable and the propagation factor, wherein the exertion counter is configured to calculate the user's exertion parameter by using, when the inclination of the propagation base is negative, a first functional dependence of the exertion parameter on the propagation variable and the gravitational motion variable and, when the inclination of the propagation base is positive, a second functional dependence of the exertion parameter on the propagation variable and the gravitational motion variable, the second functional dependence producing, with at least one value pair of the propagation variable and the gravitational motion variable, an exertion parameter which is different from the exertion parameter produced by the first functional dependence with said value pair.

7. A user-specific performance monitor as claimed in claim 6, further comprising:
a pulse measuring device configured to measure motion pulses generated by the user's limb;
a pulse filter configured to accept the motion pulses that fulfill predefined criteria; and
wherein the propagation determination unit is further configured to determine the propagation variable in accordance with the accepted motion pulses.

8. A user-specific performance monitor as claimed in claim 6, further comprising:
an activity indicator configured to determine activity of the user in accordance with the propagation variable; and
wherein the exertion counter is further configured to calculate the user's exertion parameter, if the user's activity exceeds a predefined activity limit.

9. A user-specific performance monitor as claimed in claim 6, wherein the elevation determination unit comprises a pressure gauge to measure the pressure of the environment, which is a gravitational motion variable.

10. A user-specific performance monitor, comprising:
a propagation determination unit configured to determine a propagation variable characterizing the user's propagation on a propagation route;
an elevation determination unit configured to determine a gravitational motion variable characterizing the user's propagation in the direction of the gravitational field;
an inclination determination unit configured to calculate an inclination factor proportional to the inclination of a propagation base in accordance with the propagation variable and the gravitational motion variable, the inclination of the propagation base being positive or negative in accordance with the user's motion with respect to the gravitational field;
a propagation efficiency estimator configured to calculate a propagation factor proportional to a propagation efficiency of the user as a function of the inclination factor, the propagation efficiency characterizing the user's ability to move with respect to the inclination of the propagation base; and
an exertion counter configured to calculate an exertion parameter that characterizes the user's energy consumption along the propagation route based on the propagation variable, the gravitation motion variable and the propagation factor, wherein the the exertion counter is configured to calculate the propagation factor by using, when the inclination factor is negative, a first functional dependence of the propagation factor and, when the inclination factor is positive, a second functional dependence of the propagation factor, the second functional dependence producing, with at least one value pair of the propagation variable and the gravitational motion variable, a propagation factor which is different from the propagation factor produced by the first functional dependence with said value pair.

11. A non-transitory computer-readable storage medium comprising operational instructions that, when executed by a processing device, cause the processing device to:
determine a propagation variable characterizing the user's propagation on a propagation route;
determine a gravitational motion variable characterizing the user's motion in the direction of the gravitational field;
calculate an inclination factor proportional to the inclination of a propagation base in accordance with the propagation variable and the gravitational motion variable, the inclination of the propagation base being positive or negative in accordance with the user's motion with respect to the gravitational field;
calculate a propagation factor proportional to a propagation efficiency of the user as a function of the inclination factor, the propagation efficiency characterizing the user's ability to move with respect to the inclination of the propagation base, the propagation factor having a different calculated value based on whether the inclination factor is positive or negative for the same base value of the inclination factor; and
calculate an exertion parameter that characterizes the user's energy consumption along the propagation route based on the propagation variable, the gravitational motion variable, the propagation factor and a terrain factor that indicates unevenness or softness of the prorogation base.

12. A method of monitoring a user's performance during physical exercise, the method comprising:
- determining, in a user-specific performance monitor device, a propagation variable characterizing the user's propagation on a propagation route;
- determining, in the user-specific performance monitor device, a gravitational motion variable characterizing the user's motion in the direction of the gravitational field;
- calculating, in the user-specific performance monitor device, an inclination factor proportional to the inclination of a propagation base in accordance with the propagation variable and the gravitational motion variable, the inclination of the propagation base being positive or negative in accordance with the user's motion with respect to the gravitational field;
- calculating, in the user-specific performance monitor device, a propagation factor proportional to a propagation efficiency of the user as a function of the inclination factor, the propagation efficiency characterizing the user's ability to move with respect to the inclination of the propagation base, the propagation factor having a different calculated value based on whether the inclination factor is positive or negative for the same base value of the inclination factor; and
- calculating, in the user-specific performance monitor device, an exertion parameter that characterizes the user's energy consumption along the propagation route based on the propagation variable, the gravitation motion variable, the propagation factor, and a terrain factor that indicates unevenness or softness of the prorogation base.

13. A user-specific performance monitor, comprising:
- a propagation determination unit configured to determine a propagation variable characterizing the user's propagation on a propagation route;
- an elevation determination unit configured to determine a gravitational motion variable characterizing the user's propagation in the direction of the gravitational field;
- an inclination determination unit configured to calculate an inclination factor proportional to the inclination of a propagation base in accordance with the propagation variable and the gravitational motion variable, the inclination of the propagation base being positive or negative in accordance with the user's motion with respect to the gravitational field;
- a propagation efficiency estimator configured to calculate a propagation factor proportional to a propagation efficiency of the user as a function of the inclination factor, the propagation efficiency characterizing the user's ability to move with respect to the inclination of the propagation base, the propagation factor having a different calculated value based on whether the inclination factor is positive or negative for the same base value of the inclination factor; and
- an exertion counter configured to calculate an exertion parameter that characterizes the user's energy consumption along the propagation route based on the propagation variable, the gravitation motion variable, the propagation factor and a terrain factor that indicates unevenness or softness of the prorogation base.

* * * * *

UNITED STATES PATENT AND TRADEMARK OFFICE
CERTIFICATE OF CORRECTION

| | | |
|---|---|---|
| PATENT NO. | : 7,901,326 B2 | |
| APPLICATION NO. | : 11/788787 | |
| DATED | : March 8, 2011 | |
| INVENTOR(S) | : Niva et al. | |

It is certified that error appears in the above-identified patent and that said Letters Patent is hereby corrected as shown below:

IN THE PATENT:

Column 6, line 48:

Now reads: "The term $A_1 x\ Q_n$"

Should read: -- The term $A_1 x\ Q_{Ti}$ --

Column 7, line 50:

Now reads: " $E_i^{pos} = A_1^{pos} \times Q_{Ti} + A_3^{pos} \times Q^2_{Ti} + A_4^{pos} \times Q^2_{Gi} + A_5^{pos} \times Q_{Ti} \times Q_{Gi}$ "

Should read: -- $E_i^{pos} = A_1^{pos} \times Q_{Ti} + A_2^{pos} \times Q_{Gi} + A_3^{pos} \times Q^2_{Ti} + A_4^{pos} \times Q^2_{Gi} + A_5^{pos} \times Q_{Ti} \times Q_{Gi}$ --

Column 10, line 3:

Now reads: "+ 25% of the"

Should read: -- ± 25% of the --

Signed and Sealed this
Fourth Day of September, 2012

David J. Kappos
*Director of the United States Patent and Trademark Office*